United States Patent
Park et al.

(10) Patent No.: US 9,240,959 B2
(45) Date of Patent: Jan. 19, 2016

(54) METHOD FOR PACKET CLASSIFICATION AND DEVICE THEREFOR

(71) Applicants: Ajou University Industry-Academic Cooperation Foundation, Suwon, Gyeonggi-do (KR); SECUI Corporation, Seoul (KR)

(72) Inventors: Woo Guil Park, Seoul (KR); Young June Choi, Gyeonggi-do (KR); June Seung Na, Gyeonggi-do (KR); Jeong Ae Lee, Seoul (KR); Je Bum Kyung, Seoul (KR)

(73) Assignees: Ajou University Industry-Academic Cooperation Foundation, Suwon, Gyeonggi-do (KR); Secui Corporation, Seoul (KR)

( * ) Notice: Subject to any disclaimer, the term of this patent is extended or adjusted under 35 U.S.C. 154(b) by 97 days.

(21) Appl. No.: 14/250,235

(22) Filed: Apr. 10, 2014

(65) Prior Publication Data

US 2014/0219283 A1  Aug. 7, 2014

Related U.S. Application Data

(63) Continuation of application No. PCT/KR2012/008181, filed on Oct. 10, 2012.

(30) Foreign Application Priority Data

Oct. 11, 2011 (KR) .................. 10-2011-0103356

(51) Int. Cl.
  *H04L 12/947* (2013.01)
  *H04L 12/70* (2013.01)
(52) U.S. Cl.
  CPC ............. *H04L 49/25* (2013.01); *H04L 47/00* (2013.01)

(58) Field of Classification Search
  None
  See application file for complete search history.

(56) References Cited

U.S. PATENT DOCUMENTS

| 7,747,553 B2 | 6/2010 | Liang et al. |
| 7,872,993 B2 | 1/2011 | Bailey et al. |

(Continued)

FOREIGN PATENT DOCUMENTS

| KR | 2005-0108301 A | 11/2005 |
| KR | 10-0965552 B1 | 6/2010 |

(Continued)

OTHER PUBLICATIONS

Choi, et al. "Scalable Packet Classification through Rulebase Partitioning using the Maximum Entropy Hashing", IEEE, Nov. 2004.

(Continued)

*Primary Examiner* — Hong Cho
(74) *Attorney, Agent, or Firm* — Mintz Levin Cohn Ferris Glovsky and Popeo, P.C.; Kongsik Kim

(57) ABSTRACT

Disclosed are a method of packet classification and a device thereof. A method for packet classification according to one embodiment of the present invention comprises the steps of: partitioning the entire rule set by using key values corresponding to packet fields, into a plurality of rule subsets; generating recursive flow classification (RFC) tables for each of the plurality of partitioned rule subsets; loading, in the same cache line, both partition information and RFC table information commonly corresponding to key values of received packets; searching for a rule subset by using the partition information on the key values of the received packets, which are loaded in the cache line; and searching for an RFC table for a rule by using the RFC table information on the key values of the received packets, which are loaded in the cache line.

12 Claims, 13 Drawing Sheets

(56) References Cited

U.S. PATENT DOCUMENTS

| | | | | |
|---|---|---|---|---|
| 7,978,709 B1* | 7/2011 | Venkatachary | ......... | H04L 45/00 370/395.32 |
| 2006/0164980 A1* | 7/2006 | Guru | ....................... | H04L 47/10 370/229 |
| 2006/0221954 A1* | 10/2006 | Narayan | ................. | H04L 45/00 370/389 |
| 2008/0243748 A1* | 10/2008 | Liang | ..................... | H04L 45/48 706/47 |

FOREIGN PATENT DOCUMENTS

| KR | 2010-0092102 A | 8/2010 |
|---|---|---|
| KR | 10-0996136 B1 | 11/2010 |
| KR | 2011-0077869 A | 7/2011 |
| KR | 2011-0082026 A | 7/2011 |

OTHER PUBLICATIONS

Gupta, et al. "Packet Classification on Multiple Fields", Computer Systems Laboratory, Stanford University Apr. 10, 2014.

Wang, Pi-Chung, "Scalable Packet Classification with Controlled Cross-Producting" Computer Networks (2009) 821-834 pp.

* cited by examiner

FIG. 3

| $P_{K1}$ | $R_{K1}$ |
|---|---|

First cache line

| $P_{K2}$ | $R_{K2}$ |
|---|---|

Second cache line

| $P_{K3}$ | $R_{K3}$ |
|---|---|

Third cache line

Original total rule set → Sub rule sets → RFC table building → Chunk container building

METHOD FOR PACKET CLASSIFICATION AND DEVICE THEREFOR

CROSS-REFERENCE TO RELATED APPLICATIONS

This application is a continuation of PCT/KR2012/008181 filed on Oct. 10, 2012, which claims priority to Korean Patent Application No. 10-2011-0103356 filed in the Korean Intellectual Property Office on Oct. 11, 2011, the entire contents of which are incorporated herein by reference.

TECHNICAL FIELD

The present invention relates to packet classification and, more particularly, to a packet classification method and a device thereof, which can reduce the number of memory access and improve speed of searching for a rule by partitioning a rule set into a plurality of independent sub rule sets according to preset key values of a packet.

BACKGROUND ART

With the rapid advancement in Internet, packet forwarding comes to be a very important task of a router to improve quality of Internet services. Packet forwarding is a work of sending out a packet toward a final destination network using header information of the packet flowing into the router.

Requests on various kinds of services in the Internet make it further difficult to process a packet. For example, an application program such as audio or video streaming sensitive to transfer speed requests quality assurance, and a variety of services such as firewall protection, load balancing, web switching, Intrusion Detection and Security (IDS) and the like are also required. In order to provide such services, packet classification in the router should be preceded.

In packet forwarding, packets should be processed and sent out in accordance with input link speed, and it can be said that packet classification is a work more sensitive to packet processing speed since all the fields in the packet header information should be examined unlike an IP address search which simply confirms and processes only a destination address. Accordingly, studies on various packet classification structures for effectively performing packet classification are actively under progress. The most important criterion for evaluating performance of a packet classification structure is packet processing speed, and the packet processing speed is determined by the number of memory access. The second important criterion is memory size required to store a packet classification table. The required memory size depends on the data structure of the packet classification table.

Recursive flow classification (RFC) algorithm among conventional packet classification algorithms is one of the algorithms capable of classifying a packet at a high speed. However, there is a limit in practically using this algorithm since a memory use amount, a table generation time and a table size are exponentially increased according to the number of rules.

Although a lot of algorithms have been proposed thereafter, most of them have a problem in that search speed, which is the most important, is lowered in return for solving the problems of the RFC algorithm. For example, in a method proposed in a paper entitled "Scalable Packet Classification through Maximum Entropy Hashing", IEEE/ACM Transactions on Networking, published December, 2009. a partitioning technique is used to divide an total rule set into a plurality of small sub rule sets, and if RFC tables are generated for the small sub rule sets, the size and generation time of the RFC tables are reduced greatly.

However, in order to find actually a rule corresponding to a given key, such a partitioning technique needs a process of searching for a sub rule set containing the rule, and a process of searching for an RFC table is performed after the sub rule set is found, and thus overall search performance is lowered compared with a case of simply searching for only an RFC table.

Accordingly, there is a need for a method capable of improving the search speed by reducing the number of memory access.

SUMMARY OF THE DISCLOSURE

The present invention has been made to solve the above problems occurring in the prior art, and an object of the present invention is to provide a packet classification method and a system thereof, which can reduce memory use amount and improve search speed.

Specifically, the present invention may reduce the number of memory access and improve speed of searching for a partition and an RFC table of a rule using the same memory use amount by loading together both of partition information and RFC table information of sub rule sets commonly corresponding to a key value on the same cache line.

In addition, an object of the present invention is to provide a packet classification method and a device thereof, which can reduce memory use amount and improve search speed by reducing the number of memory access, which is accomplished by collectively managing information on RFC tables of sub rule sets in a chunk container, searching for partition information and RFC table information corresponding to a key value through the chunk container and loading together both of the partition information and the RFC table information on the same cache line.

In addition, an object of the present invention is to provide a packet classification method and a device thereof, which can improve performance of routing equipment and packet transmission speed by improving packet classification and search speed.

In order to achieve the above objects, a packet classification method in accordance with an embodiment of the present invention includes steps of: partitioning an original total rule set into a plurality of sub rule sets using key values corresponding to fields of a packet; generating a Recursive Flow Classification (RFC) table for each of the partitioned sub rule sets; loading together both of RFC table information and partition information commonly corresponding to a key value of the received packet on a same cache line; searching for a sub rule set using the partition information corresponding to the key value of the received packet loaded on the cache line; and searching for an RFC table corresponding to a rule of the received packet loaded on the cache line from among the searched sub rule sets using the RFC table information corresponding to the key value of the received packet loaded on the cache line.

The step of partitioning an original total rule set into the plurality of sub rule sets may further comprise at least one of: partitioning in a pre-determined sequence for the key values of the packet; and partitioning by sequentially searching for optimum key values among the key values corresponding to the fields of the packet.

A sequence of key values for searching for the sub rule set may be different from a sequence of key values for searching for the RFC table.

The step of loading may load only RFC table information corresponding to a relevant key value of the cache line among the RFC table information corresponding to each of the plurality of sub rule sets.

A packet classification method in accordance with another embodiment of the present invention includes steps of: partitioning an original total rule set into a plurality of sub rule sets using key values corresponding to fields of a packet; generating a Recursive Flow Classification (RFC) table for each of the partitioned sub rule sets; generating a chunk container which defines a relation between partition indexes related to the partitions and Class BitMap (CBM) indexes of the RFC tables according to the key values; searching the generated chunk container using the key values of the received packet, and loading together both of a CBM index and a partition index commonly corresponding to a key value of the received packet on a same cache line; and searching for a partition and an RFC table corresponding to the received packet using the CBM index and the partition index loaded on the cache line.

The step of generating the chunk container may further comprise: generating at least one or more chunk containers, a size of a field of which varies depending on a size of the cache line, the number of sub rule sets to be supported and a size of table memory.

The chunk container may include at least one of the CBM index and a rule index.

The step of searching for the partition and the RFC table may further comprise: searching for a CBM index related to the received packet using the chunk containers generated according to the key values from the sub rule set corresponding to the searched partition; and searching for an RFC table related to the received packet using the searched CBM index.

A packet classification device in accordance with an embodiment of the present invention includes a processor which comprises: a partitioning unit configured to partition an original total rule set into a plurality of sub rule sets using key values corresponding to fields of a packet; a generation unit configured to generate an RFC table for each of the partitioned sub rule sets; a loading unit configured to load together both of RFC table information and partition information commonly corresponding to a key value of the received packet on a same cache line; and a search unit configured to search for a sub rule set using the partition information corresponding to the key value of the received packet loaded on the cache line, and search for an RFC table corresponding to a rule of the received packet loaded on the cache line from among the searched sub rule sets using the RFC table information corresponding to the key value of the received packet loaded on the cache line.

A packet classification device in accordance with another embodiment of the present invention includes a processor which comprises: a partitioning unit configured to partition an original total rule set into a plurality of sub rule sets using key values corresponding to fields of a packet; a first generation unit configured to generate a Recursive Flow Classification (RFC) table for each of the partitioned sub rule sets; a second generation unit configured to generate a chunk container which defines a relation between partition indexes related to the partitions and Class BitMap (CBM) indexes related to the RFC tables according to the key values; a loading unit configured to search the generated chunk container using the key values of the received packet, and load together both of a CBM index and a partition index commonly corresponding to a key value of the received packet on a same cache line; and a search unit configured to search for a partition and an RFC table corresponding to the received packet using the CBM index and the partition index loaded on the cache line.

In accordance with the present invention, since both of partition information for partitioning an original total rule set into a plurality sub rule sets and RFC table information of the sub rule sets are loaded together on the same cache line, speed of searching for a partition and an RFC table of a rule can be improved using the same memory use amount.

Also, since RFC tables generated for the sub rule sets are combined in one chunk container and both of information on a partition and information on an RFC table are loaded together on a cache line by searching the chunk container, the present invention may reduce memory use amount and improve search speed by reducing the number of memory access.

That is, since both of information on a partition and information on an RFC table commonly corresponding to the same key value are loaded together, memory may be accessed only once for one key value when a partition is searched for first and then an RFC table is searched for next in the event of packet classification, and the memory does not need to be accessed several times. Since the memory access invites loss of time much greater than that of an operation of a processor, the overall packet classification time can be reduced greatly if the number of memory access is reduced.

Furthermore, the present invention may improve performance of equipment and packet transmission speed on a network by improving the speed of searching for a packet classification rule.

The present invention is advantageous in that overall system performance and network speed can be improved by applying the present invention to equipment for classifying and transmitting a packet, such as a router or the like.

BRIEF DESCRIPTION OF THE DRAWINGS

The above and other objects, features and advantages of the present invention will be more clearly understood from the following detailed description taken in conjunction with the accompanying drawings, in which:

FIG. 3 shows an exemplary view of a cache line for illustrating step S160 shown in FIG. 1;

DETAILED DESCRIPTION OF THE DISCLOSURE

Figure 1:
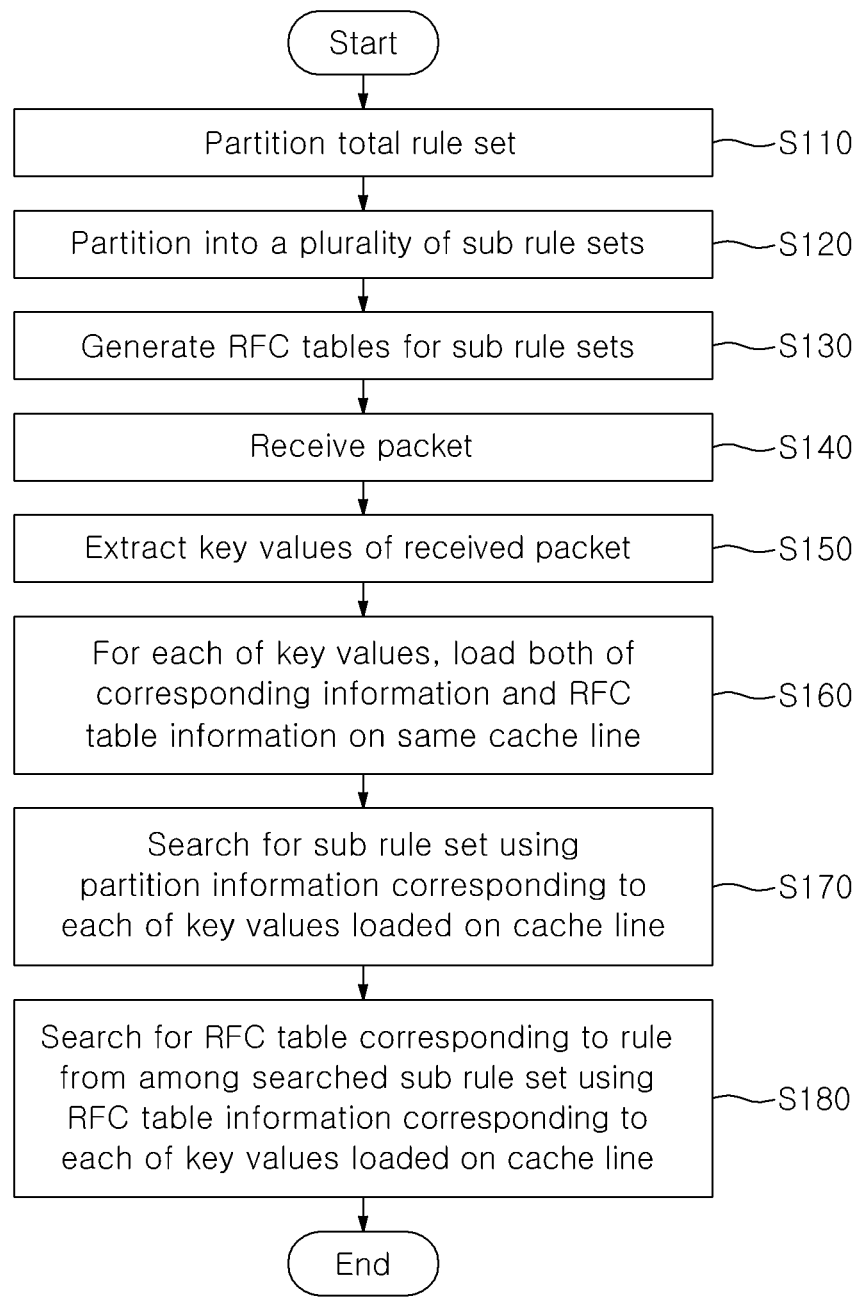
FIG. 1 shows a flowchart illustrating an operation of a packet classification method in accordance with an embodiment of the present invention.

In addition to the above objects, other objects and characteristics of the present invention will become evident from the following description in conjunction with the accompanying drawings.

Preferred embodiments of the present invention are described in detail with reference to the accompanying drawings. A detailed description of known functions and constitutions is omitted if it is deemed to make the gist of the present invention unnecessarily vague.

However, the present invention is not restricted or limited by the embodiments. The same reference numerals suggested in each drawing denote the same elements.

Hereinafter, a packet classification method and a device thereof in accordance with an embodiment of the present invention will be described in detail with reference to FIGS. 1 to 13.

FIG. 1 shows a flowchart illustrating an operation of a packet classification method in accordance with an embodiment of the present invention.

Referring to FIG. 1, the packet classification method partitions an original total rule set into a plurality of sub rule sets S110 and S120.

Here, the partitioning means dividing an original total rule set into a plurality of sub rule sets, in which the partitioning is performed using key values of fields of a packet, and the original total rule set is partitioned into a plurality of sub rule sets by performing the partitioning until a pre-determined condition is satisfied for each of the key values.

At this point, the partitioning may be sequentially performed for the key values corresponding to the fields of the packet, or the partitioning may be performed for all the key values in a method of searching for an optimum key value among the key values and then performing partitioning again after searching for a next optimum key value.

Here, the optimum key value may be selected to have a largest keys. For example, if it is assumed that key value K1 includes two keys of K1_1 and K1_2, key value K2 includes three keys of K2_1, K2_2 and K2_3, and key value K3 includes four keys of K3_1, K3_2, K3_3 and K3_4, the partitioning may be performed using K3 first, then using K2, and finally using K1.

Any tree-based method, i.e., a method which sequentially views every field, can be used for the partitioning in the present invention, and a representative method may be a hicut method. Each sub rule set should be partitioned to minimally overlapped with each other.

When a rule is totally configured of five fields, e.g., 1) fields of a source IP of 32 bits, 2) a destination IP of 32 bits, 3) a source port, 4) a destination port and 5) a protocol, key values of the fields can be configured of upper sixteen bits (SIP_U16 and DIP_U16) and lower sixteen bits (SIP_L16 and DIP_L16) of a source IP and a destination IP, a source port, a destination port and a protocol, and partitioning can be accomplished according to the sequence of the key values determined as such.

Figure 2:
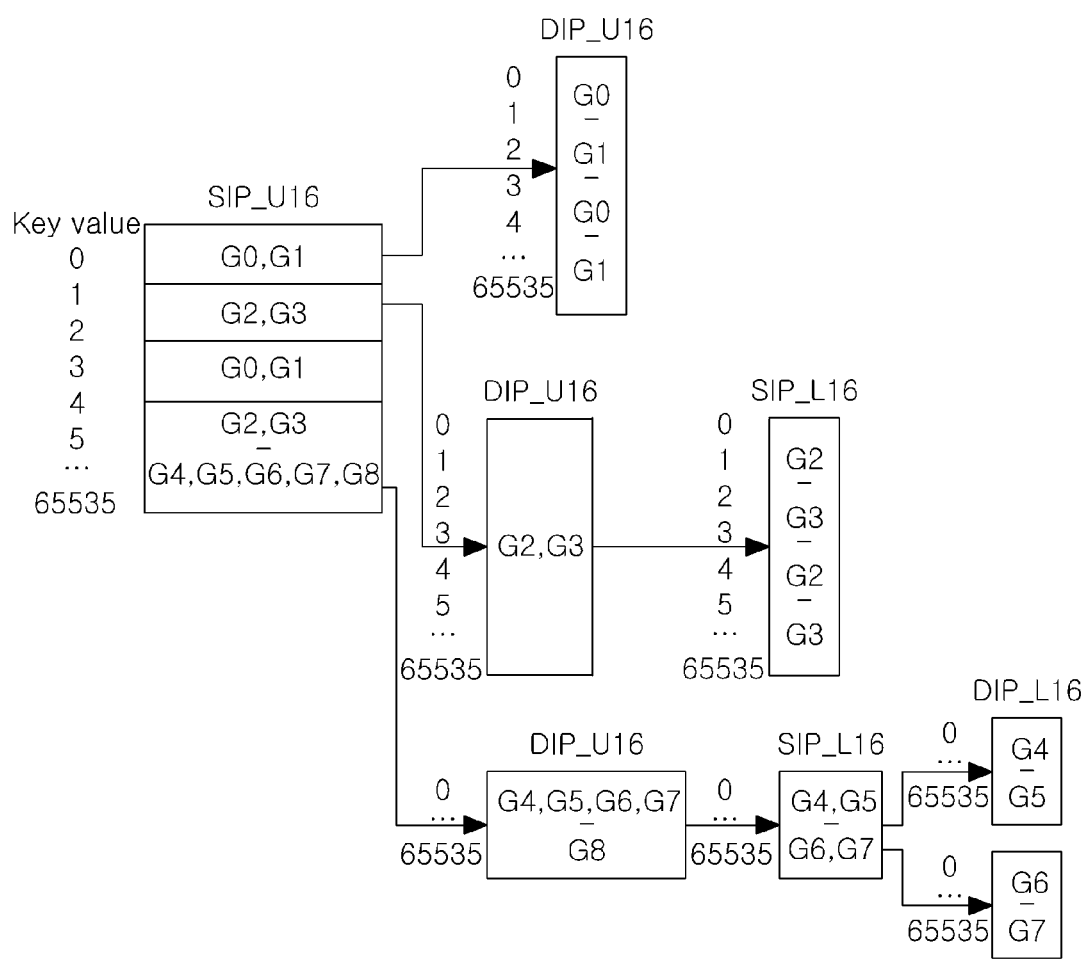
FIG. 2 shows an exemplary diagram illustrating a partitioning process according to a predetermined sequence of key value.

A simple example will be described with reference to FIG. 2 assuming that there is a rule set configured of two fields such as a source IP and a destination IP, instead of a general rule set configured of the five fields. As shown in FIG. 2, the rule set is partitioned into three sub rule sets of (G0,G1), (G2,G3) and (G4,G5,G6,G7,G8) according to the range of the upper sixteen bit value of the source IP (SIP_U16). Here, GN denotes an N-th set among the final sub rule sets, and N is an integer equal to or larger than zero.

Next, each of the sub rule sets is partitioned again into five sub rule sets of G0, G1, (G2,G3), (G4,G5,G6,G7) and G8 according to the range of the upper sixteen bit value of the destination IP (DIP_U16), and if partitioning is also performed on the other fields (the lower sixteen bit value of the source IP (SIP_L16) and the lower sixteen bit value of the destination IP (DIP_L16)), the rule set is partitioned into nine sub rule sets.

If a rule set is partitioned into a plurality of sub rule sets based on the key values, a Recursive Flow Classification (RFC) table is generated for each of the sub rule sets S130.

Here, since a method of generating RFC tables for the sub rule sets is apparent to those skilled in the art, description thereof will be omitted. An example of the method of generating RFC tables is shown prior art such as "Scalable Packet Classification through Maximum Entropy Hashing", IEEE/ACM Transactions on Networking, published December, 2009.

Information on the partitions and RFC tables generated at steps S120 and S130 may be stored in memory.

Next, if a packet is received from outside, pre-determined key values are extracted from the fields of the received packet S140 and S150.

For example, if it is assumed that the pre-determined key values are K1 of a first field, K2 of a second field and K3 of a third field, key values of K1, K2 and K3 are extracted from the first through third fields of the packet.

Both of partition information and RFC table information corresponding to the range of each of the extracted key values of K1, K2 and K3 are searched for and loaded together on a cache line S160. That is, as shown in the example of FIG. 3, both of partition information $P_{k1}$ and RFC table information $R_{k1}$ corresponding to the range of the extracted key value of K1 are searched for and loaded together on a corresponding cache line, i.e., a first cache line, both of partition information $P_{K2}$ and RFC table information $R_{K2}$ corresponding to the range of the extracted key value of K2 are searched for and loaded together on a corresponding cache line, i.e., a second cache line, and both of partition information $P_{K3}$ and RFC table information $R_{K3}$ corresponding to the range of the extracted key value of K3 are searched for and loaded together on a corresponding cache line, i.e., a third cache line.

At this point, the loading step S160 preferably loads only the RFC table information corresponding to a relevant key value of the cache line among the RFC table information of a plurality of sub rule sets.

A sub rule sets of the received packet is searched for using the partition information of the extracted key values loaded on the cache line S170.

For example, in FIG. 3, a sub rule set including the rule of the received packet is searched for using the partition information $P_{k1}$ corresponding to the range of the extracted key value of K1, the partition information $P_{K2}$ corresponding to the range of the extracted key value of K2, and the partition information $P_{K3}$ corresponding to the range of the extracted key value of K3.

Although it is described that a sub rule set is search for after partition information and RFC table information corresponding to all key values are loaded on the cache line at steps S160 and S170 of the present invention, it is not limited thereto, and a step of searching for a sub rule set corresponding to the first key value after partition information and RFC table information corresponding to the first key value are loaded on a cache line and a step of searching for a sub rule set corresponding to the second key value after partition information and RFC table information corresponding to the second key value are loaded on another cache line may be sequentially performed for all the key values.

If a sub rule set of the received packet has been searched for, an RFC table of a rule is searched for from the searched sub rule set using the RFC table information of each of the key values loaded on the cache line S180.

For example, in FIG. 3, an RFC table of a rule of the received packet is searched for from the searched sub rule set using the RFC table information $R_{K1}$ corresponding to the range of the extracted key value of K1, the RFC table information $R_{K2}$ corresponding to the range of the extracted value of K2, and the RFC table information $R_{K3}$ corresponding to the range of the extracted value of K3.

Like this, since a partitioning technique is used and partition information and RFC table information corresponding to a relevant key value are simultaneously loaded on a cache line corresponding to the key value, the packet classification method in accordance with the present invention may reduce the number of memory access and thus improve search speed when the RFC table information is searched for after searching for the partition information.

Furthermore, the present invention may improve performance of equipment and packet transmission speed on a network by improving packet classification and search speed.

In addition, in FIG. 1, although the sequence of key values for searching for a sub rule set may be the same as the sequence of key values for searching for an RFC table of a rule, they can be different from each other.

Figure 4:
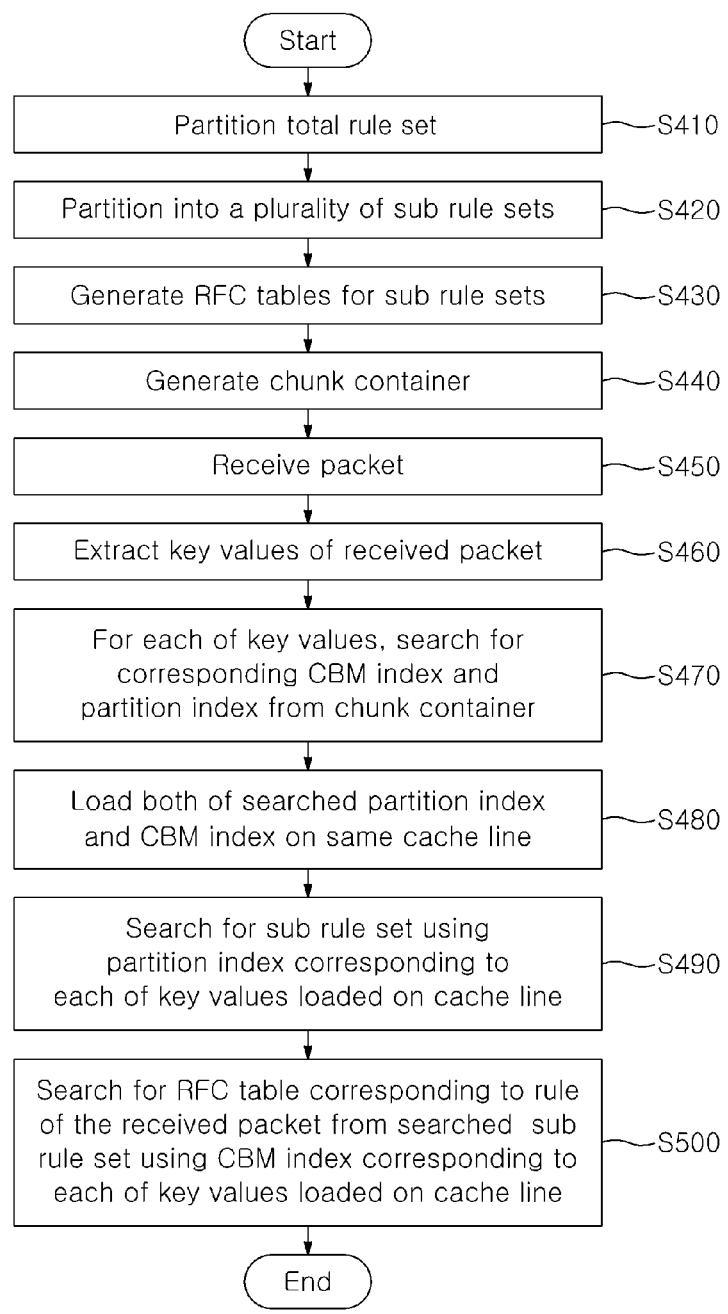
FIG. 4 shows a flowchart illustrating an operation of a packet classification method in accordance with another embodiment of the present invention.

FIG. 4 shows a flowchart illustrating an operation of a packet classification method in accordance with another embodiment of the present invention.

Referring to FIG. 4, the packet classification method partitions an original total rule set into a plurality of sub rule sets S410 and S420.

The partitioning shown in FIG. 4 may also be sequentially performed for the key values corresponding to the fields of the packet as shown in FIG. 1, or the partitioning may be performed by sequentially searching for optimum key values among the key values.

If the original total rule set is partitioned into a plurality of sub rule sets based on the key values, a Recursive Flow Classification (RFC) table may be generated for each of the sub rule sets S430.

If the RFC table has been generated for each of the sub rule sets, a chunk container is generated using information on the generated RFC tables S440.

Of course, it is preferable that the chunk container is stored in a storage means provided in the equipment, such as a router.

Figure 5:
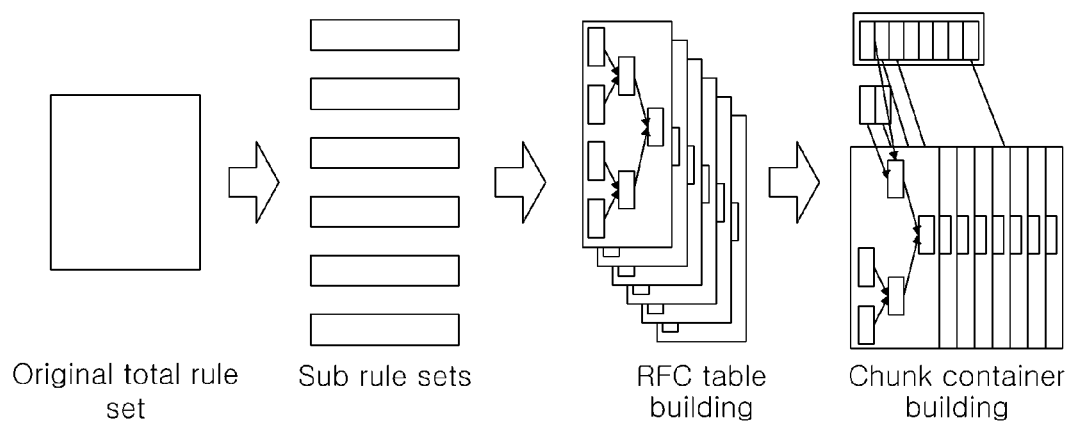
FIG. 5 shows a schematic diagram illustrating a procedure of steps S410 to S440.

FIG. 5 shows a schematic diagram illustrating a procedure of steps S410 to S440. As shown in the figure, it shows a procedure of partitioning an original total rule set into a plurality of sub rule sets, generating an RFC table for each of the partitioned sub rule sets, and generating a chunk container using the generated RFC tables.

Hereinafter, the procedure of generating an RFC table for each of the sub rule sets and generating a chunk container by combining two generated RFC tables will be described with reference to FIGS. 6 to 8. Here, X denotes non-existence of a corresponding value in the entry.

Figure 6:
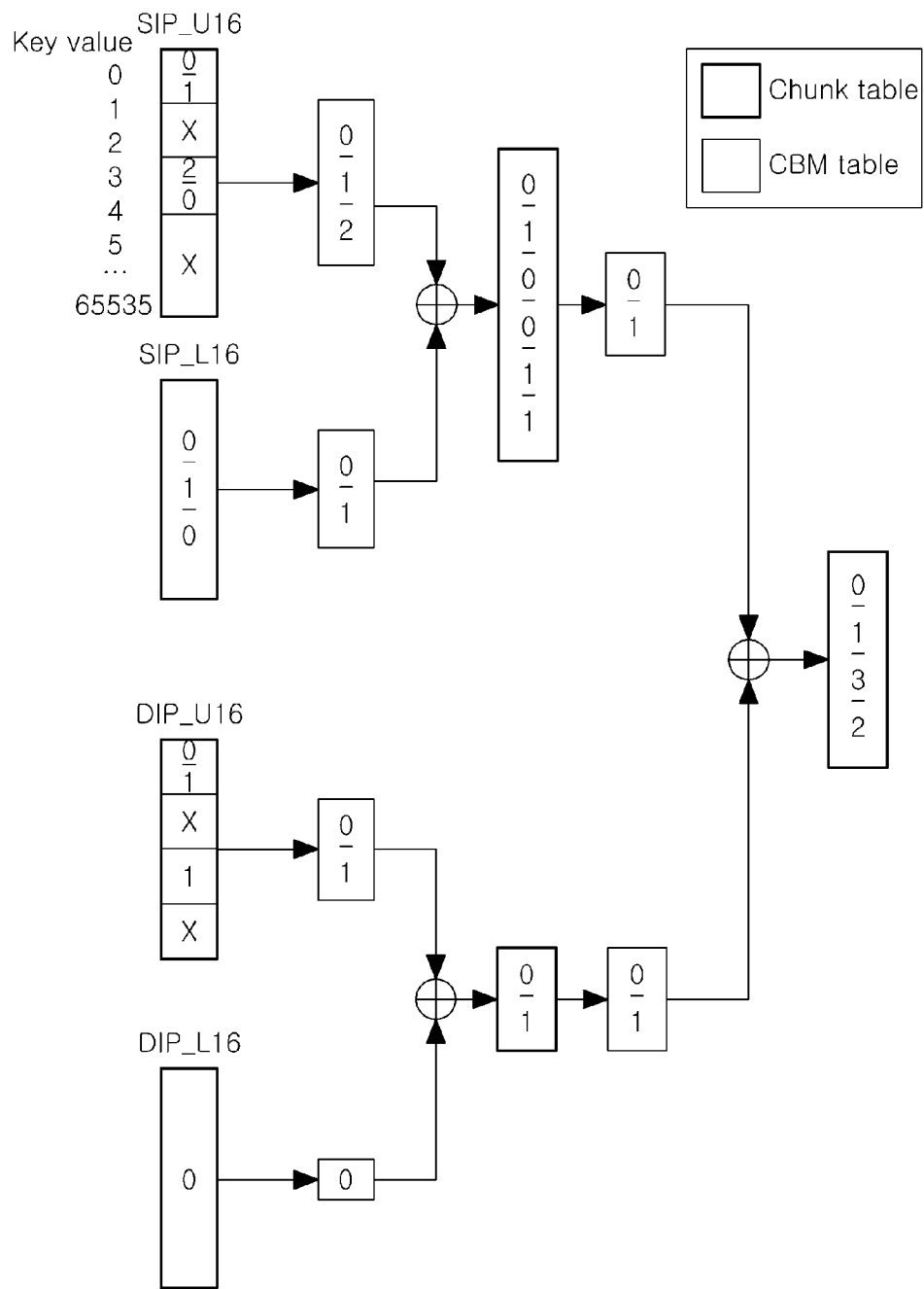
FIG. 6 shows an example of an RFC table of sub rule set G0 among the sub rule sets shown in FIG. 2.
Figure 7:
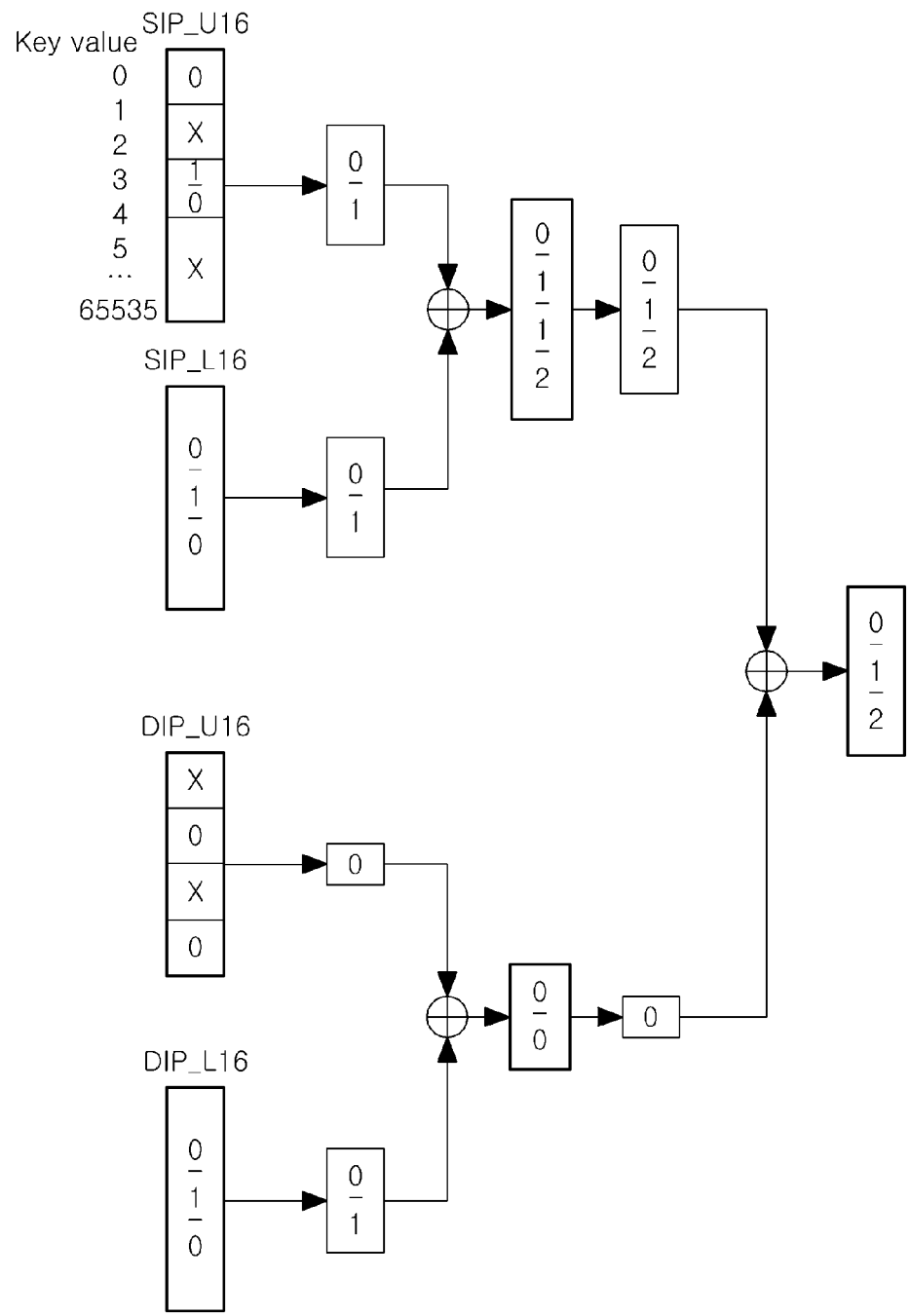
FIG. 7 shows an example of an RFC table of sub rule set G1 among the sub rule sets shown in FIG. 2.

FIGS. 6 and 7 show an example of RFC tables of sub rule sets G0 and G1 among the sub rule sets shown in FIG. 2, and it is understood that chunk table entries are filled with Class BitMap (CBM) index values of the RFC tables generated for the key values as shown in the figure. In addition, symbol (+) represents a process of calculating a next chunk index using two CBM indexes in the RFC table. That is, a relation among the key values, the CBM indexes and a plurality of chunk containers may be understood by calculating a next chunk index related to an RFC table generated based on two key values using two CBM indexes of two RFC tables corresponding to the two key values and calculating a still next chunk key index using a CBM index of an RFC table generated using the calculated chunk index and another key value.

Figure 8:
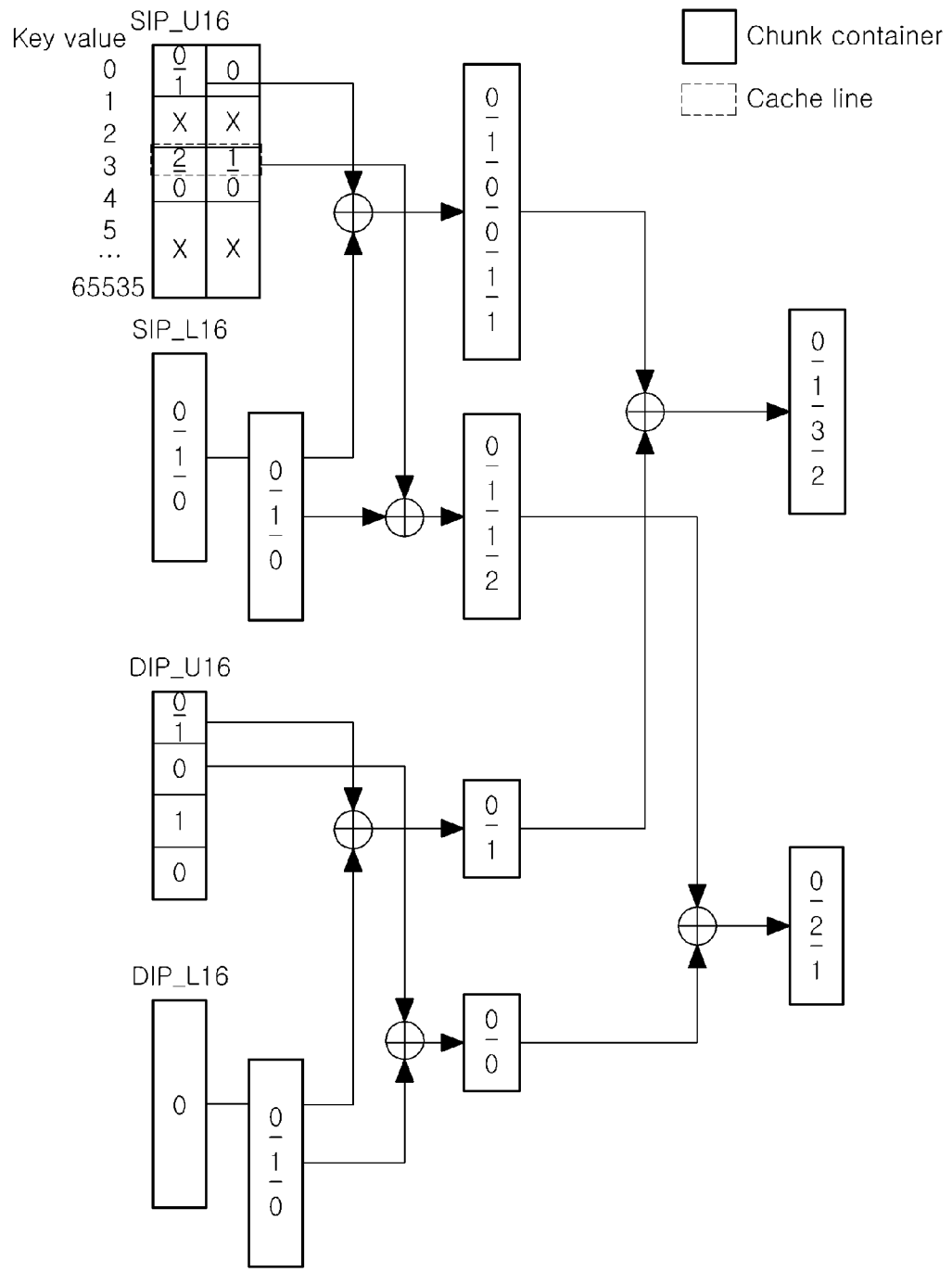
FIG. 8 shows an example of a chunk container which combines RFC tables of two sub rule sets G0 and G1.

FIG. 8 shows an example of a chunk container which combines RFC tables of two sub rule sets G0 and G1. As shown in the FIG. 8, if RFC tables are completed for two sub rule sets G0 and G1, the chunk container combines tables generated for respective fields and steps as a table using an RFC algorithm and places entries of the same index on one cache line.

When the entries of the same index in the RFC table loaded on the same cache line, any entry corresponding to a specific sub rule may be found on the cache line because the entry has been already loaded regardless in the entry is corresponding to which sub rule set. This means secondary searching for a table entry may not cost a memory access, so additive memory access can be avoided and searching speed may be improved.

More specifically, the chunk table is generated by combining RFC table information of at least two or more sub rule sets, and the chunk table defines a connection relation between the partition index and the rule index of a sub rule set or between information on the RFC table, e.g., CBM index, and the chunk index.

The elements configuring the chunk container include a chunk index, a chunk container address, a CBM index, a partition index, a rule index and the like, and a variety of chunk containers may be configured by appropriately arranging the elements.

In addition, a size of a field configuring the chunk container may vary depending on the size of a cache line on which the partition index and the CBM index are loaded, the number of sub rule sets that should be supported, the size of table memory and the like.

Referring to FIG. 4 again, if at least one or more chunk containers are generated, key values for searching for a sub rule set and an RFC table are extracted from the fields of the packet received from outside S450 and S460.

If key values of the received packet are extracted, a CBM index and a partition index of an RFC table corresponding to each of the extracted key values are searched for from the chunk container, and the searched partition index and CBM index are loaded together on a cache line commonly corresponding to each of the key values S470 and S480.

A sub rule set corresponding to the received packet is searched for using a partition index corresponding to each of the key values loaded on the cache line S490.

If a sub rule set of the received packet is searched for, an RFC table of a rule of the received packet is searched for from the searched sub rule set using a CBM index corresponding to each of the key values loaded on the cache line together with the partition index S500.

As is shown in FIG. 1, although the sequence of key values for searching for a partition index of a sub rule set may be the same as the sequence of key values for searching for a CBM index of an RFC table of a rule, they can be different from each other.

Figure 10:
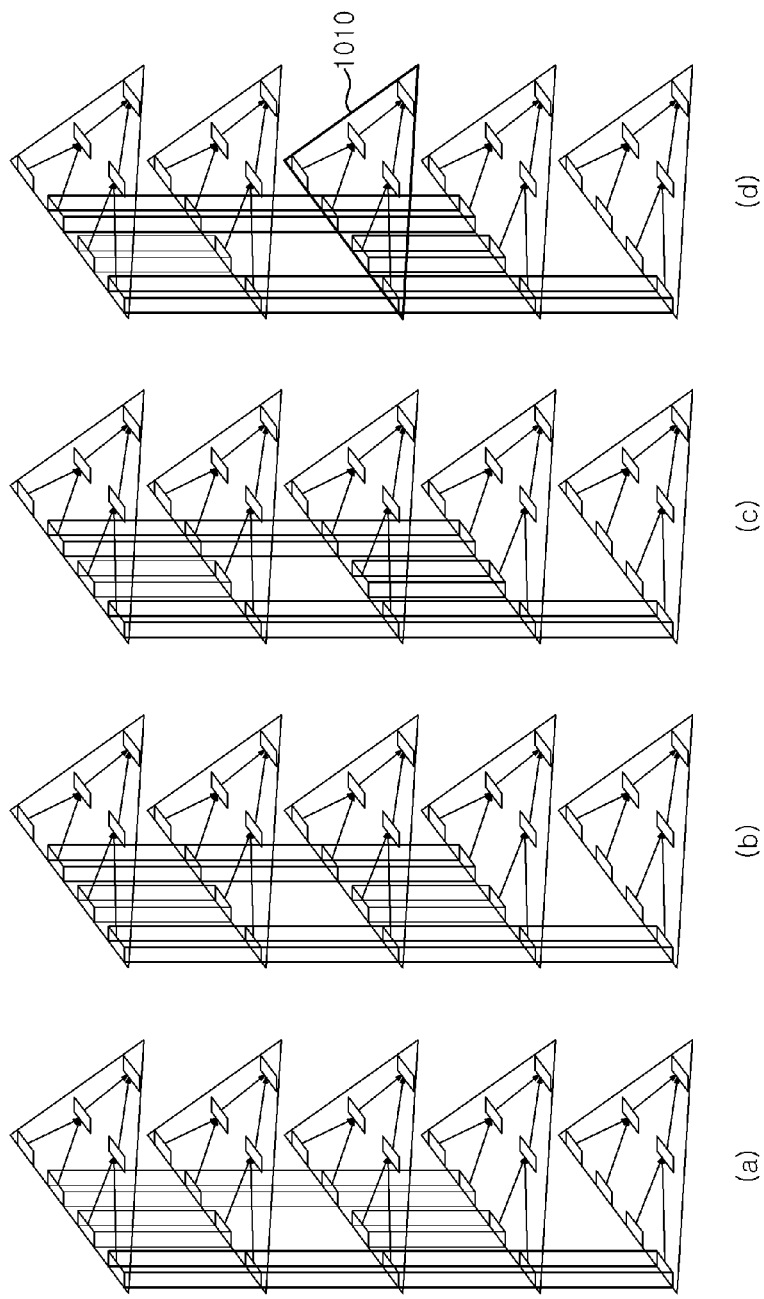
FIG. 10(*a*) through 10(*d*) show examples of searching for a sub rule set of a received packet while partition indexes and CBM indexes of sub rule sets are loaded on a cache line as shown in FIG. 9.
Figure 11:
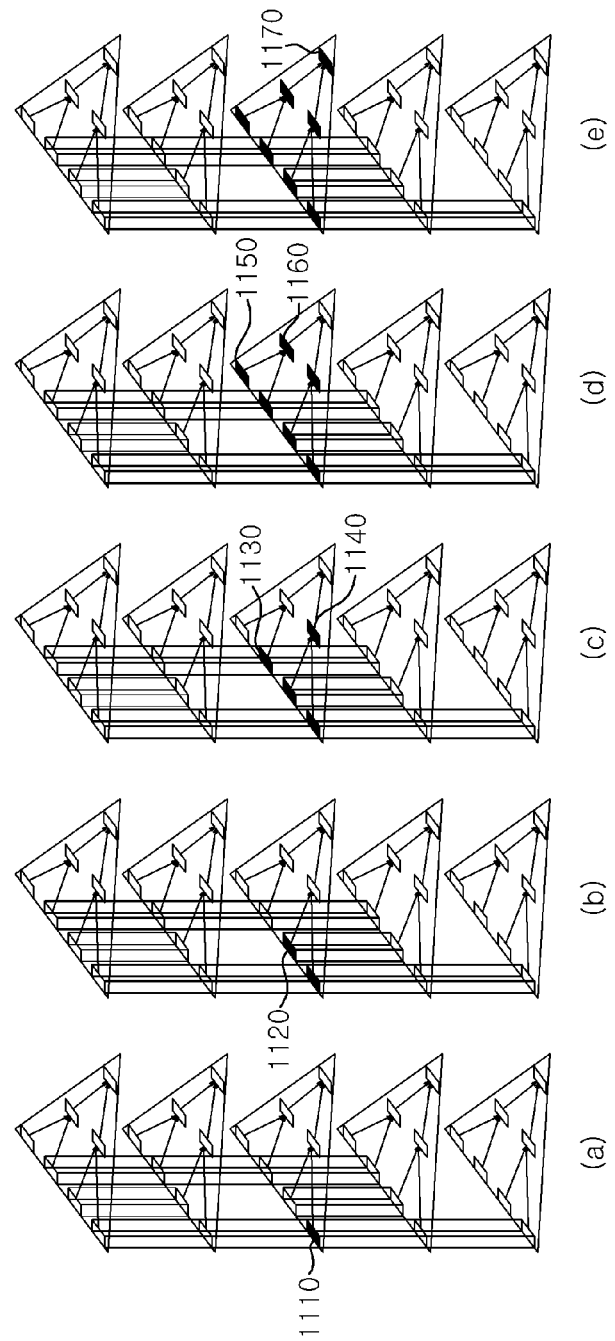
FIG. 11(a) through 11(e) show examples of searching for an RFC table of a rule from the sub rule set searched in FIG. 10.

The step of searching for a sub rule set S490 and the step of searching for an RFC table of a rule S500 are described below with reference to FIGS. 9 to 11.

Here, it will be described assuming that four key values K1, K2, K3 and K4 are extracted from a received packet, and there are five sub rule sets (sub rule sets 0 through 4) corresponding to each of the extracted key values, and the sequence of key values for searching for a sub rule set is K1, K2, K3 and K4, and the sequence of key values for searching for an RFC table of a rule is K1, K3, K2 and K4.

Figure 9:
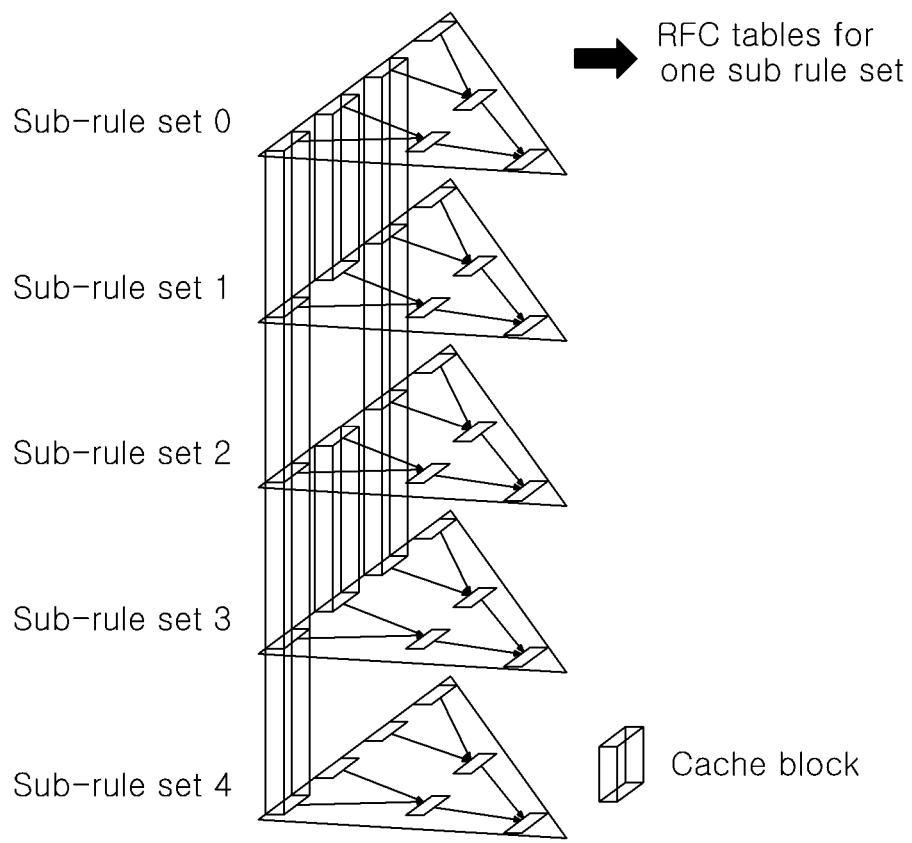
FIG. 9 shows how RFC tables of sub rule sets are connected within a chunk container.

FIG. 9 shows how RFC tables of sub rule sets are connected within a chunk container, and as is understood from FIG. 9, RFC table entries, i.e., CBM indexes, of each sub rule set are placed on memory so as to be included in a corresponding cache line according to a search sequence for partitioning, and a section expressed as a rectangular box shows a cache line (cache block). Accordingly, entries for all sub rule sets are included in one cache line for RFC tables corresponding to the first key value K1. Here, it does not mean that total five entries of sub rule sets 0 through 4 are included in one cache line. For example, as is understood from the DIP_U16 chunk container of G0 and G1 shown in FIG. 8, only an entry for G0 or G1 is included in one chunk container entry. Accordingly, entry values of corresponding sub rule sets are stored in one chunk container entry. At this point, the chunk container entry has an address sorted according to the size of the cache line so as to be included in the cache line. That is, a chunk container table is sorted and the size or the like of the chunk container entry is determined so that the chunk container entry may be included in one cache line.

For the second key value K2, entries of sub rule sets 0 and 1 are included in a cache line, entries of sub rule sets 2 and 3 are included in another cache line, and an entry of sub rule set 4 is solitarily included in still another cache line. For the third key value K3, entries of sub rule sets 0 to 3 are included in a cache line, and an entry of sub rule set 4 is solitarily included in another cache line.

FIG. 10(a) through 10(d) show examples of searching for a sub rule set of a received packet while partition indexes and CBM indexes of sub rule sets are loaded on a cache line as shown in FIG. 9, and this is an exemplary view showing the procedure of step S490.

Partition indexes, i.e., entries of the table, loaded on the cache line for the first key value K1 are read as shown in FIG. 10(a), and, next, entries of the table loaded on the cache line for the third key value K3 are read as shown in FIG. 10(b), and entries of the table loaded on the cache line for the second key value K2 are read as shown in FIG. 10(c). Finally, entries of the table loaded on the cache line for the fourth key value K4 are read as shown in FIG. 10(d), and thus a second sub rule set (sub rule set 1) 1010 is found.

If a sub rule set, i.e., a partition, is searched for through the procedure described above, an RFC table of a rule of the received packet is searched for from the sub rule set of the searched partition. FIG. 11(a) through 11(e) show examples of searching for an RFC table of a rule from the sub rule set searched in FIG. 10(a) through 10(d), and this is an exemplary view showing the procedure of step S500.

The RFC table entry 1110 already loaded on the cache line for the key value K1 of the second sub rule set is read as shown in FIG. 11(a), and, next, the RFC table entry 1120 already loaded on the cache line for the key value K2 of the second sub rule set is read as shown in FIG. 11(b).

Next, the RFC table entry 1130 already loaded on the cache line for the key value K3 and the first table entry 1140 of level two are read as shown in FIG. 11(c), and, next, the RFC table entry 1150 already loaded on the cache line for the key value K4 and the second table entry 1160 of level two are read as shown in FIG. 11(d).

Finally, as shown in FIG. 11(e), the final RFC table entry 1170 of a rule of the received packet is searched for based on the first table entry 1140 and the second table entry 1160 of level two.

As described above, since the packet classification method according to the present invention simultaneously loads partition indexes of the key values of a received packet and indexes of RFC tables on a cache line and uses the indexes of the RFC tables already loaded on the cache line when an RFC table is searched for after searing for a sub rule set of the received packet, it does not need to separately access memory, and thus search speed may be improved by reducing the number of memory access.

Figure 12:
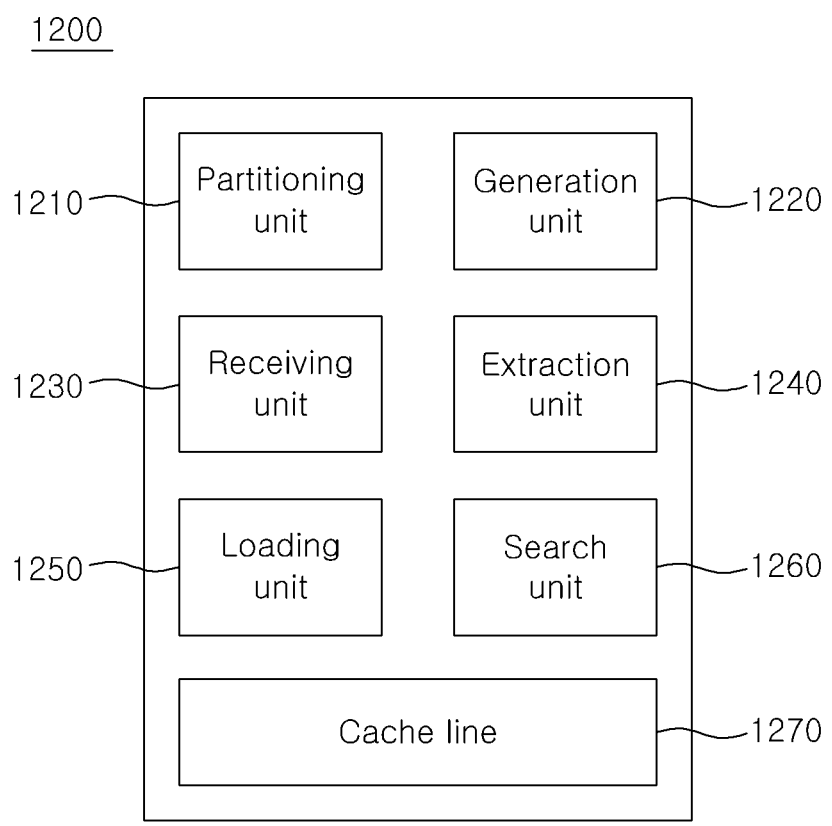
FIG. 12 shows the configuration of a packet classification device in accordance with an embodiment of the present invention.

FIG. 12 shows the configuration of a packet classification device in accordance with an embodiment of the present invention.

Referring to FIG. 12, the packet classification device 1200 includes a processor (not shown) which comprises a partitioning unit 1210, a generation unit 1220, a receiving unit 1230, an extraction unit 1240, a loading unit 1250, a search unit 1260 and a cache line 1270.

The partitioning unit 1210 partitions an original total rule set into a plurality of sub rule sets using key values corresponding to the fields of a packet.

Here, the partitioning unit 1210 may perform the partitioning according to a sequence of the key values corresponding to the fields of the packet or may search for optimum key values and perform the partitioning in the sequence of the searched optimum key values.

The generation unit 1220 generates an RFC table for each of the sub rule sets partitioned by the partitioning unit 1210.

The receiving unit 1230 receives a packet from outside, and the extraction unit 1240 extracts key values from the fields of the received packet.

The loading unit 1250 loads together both of partition information and RFC table information commonly corresponding to a key value of the received packet extracted by the extraction unit 1240 on the same cache line 1270.

The loading unit 1250 may assign a cache line to each corresponding key value and load together partition information and RFC table information corresponding to a relevant key value on the cache line.

At this point, the loading unit 1250 preferably loads only the RFC table information corresponding to a relevant key value of the cache line among the RFC tables of the plurality of sub rule sets.

The cache line 1270 stores partition information and RFC table information corresponding to each of the key values loaded by the loading unit 1250.

The search unit 1260 searches for a sub rule set using the partition information of each of the key values of the received packet loaded on the cache line 1270 and searches for an RFC table of a rule from the searched sub rule set using the RFC table information of each of the key values of the received packet loaded on the cache line 1270.

Here, the sequence of key values for searching for a sub rule set is set to be the same as or different from the sequence of key values for searching for an RFC table, and the search unit 1260 may search for an RFC table corresponding to a sub rule set and a rule.

Figure 13:
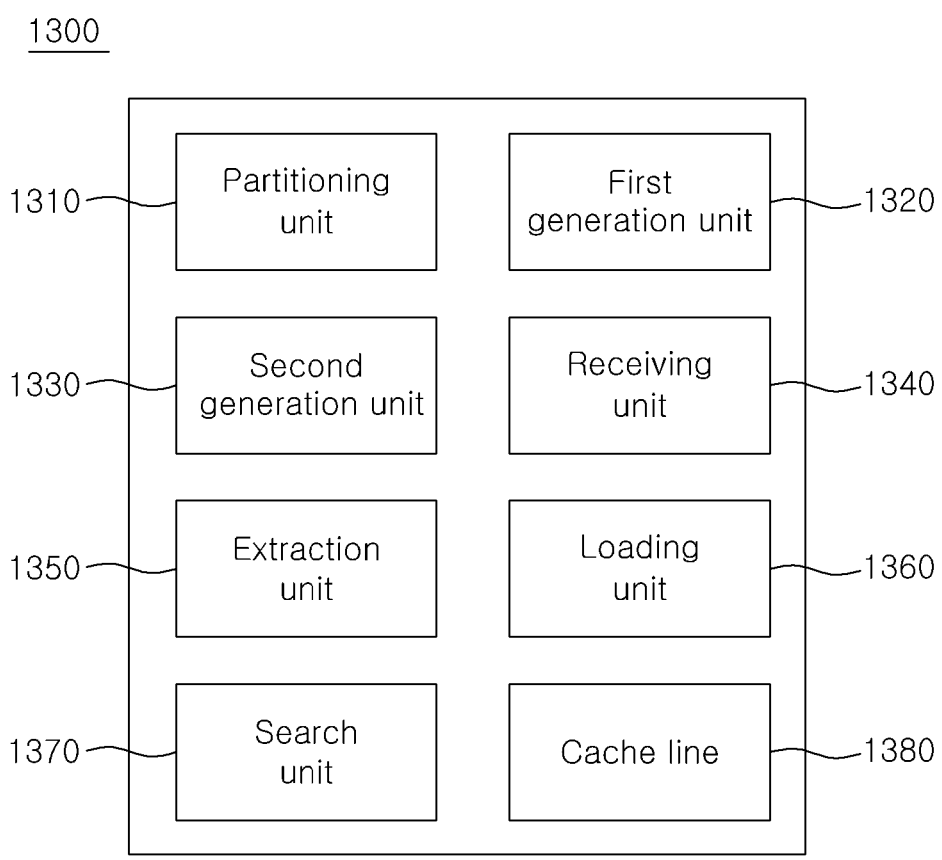
FIG. 13 shows the configuration of a packet classification device in accordance with another embodiment of the present invention.

FIG. 13 shows the configuration of a packet classification device in accordance with another embodiment of the present invention.

Referring to FIG. 13, the packet classification device 1300 includes a processor (not shown) which comprises a partitioning unit 1310, a first generation unit 1320, a second generation unit 1330, a receiving unit 1340, an extraction unit 1350, a loading unit 1360, a search unit 1370 and a cache line 1380.

The partitioning unit 1310 partitions an original total rule set into a plurality of sub rule sets using key values corresponding to the fields of a packet.

The first generation unit 1320 generates an RFC table for each of the sub rule sets partitioned by the partitioning unit 1310.

The second generation unit 1330 generates a chunk container which defines a relation between CBM indexes of the RFC tables of the key values generated by the first generation unit 1320 and partition indexes of the partitions divided by the partition unit 1310.

The receiving unit 1340 receives a packet from outside, and the extraction unit 1350 extracts key values from the fields of the received packet.

The loading unit 1360 searches for at least one or more chunk containers generated by the second generation unit 1330 for each of the key values of the received packet extracted by the extraction unit 1350 and loads together a CBM index and a partition index commonly corresponding to a key value on the same cache line 1380.

The cache line 1380 stores a partition index corresponding to each of the key values and a CBM index corresponding to the RFC table loaded by the loading unit 1360.

The search unit 1370 searches for a sub rule set using the partition index corresponding to each of the key values of the received packet loaded on the cache line 1380 and searches for an RFC table of a rule from the searched sub rule set using the CBM index of each of the key values of the received packet loaded on the cache line 1380.

At this point, the search unit 1370 may search for a sub rule set including a rule of the received packet using the partition index loaded on the cache line 1380, search for a CBM index of the received packet from the searched sub rule set and search for an RFC table corresponding to the searched CBM index.

As described above, since the packet classification device in accordance with the present invention searches for and loads together both of information on an RFC table or a CBM index commonly corresponding to a relevant key value from a chunk container when partition information or a partition index for searching for a sub rule set including a rule of a received packet is loaded on a cache line, memory does not need to be separately accessed in order to search for an RFC table after the sub rule set is searched for, and, accordingly, search speed may be improved by reducing the number of memory access.

The packet classification method in accordance with an embodiment of the present invention can be implemented in the form of a program executable by various computer means, and can be stored in a computer-readable recording medium. The computer-readable medium can include a program, a data file, a data structure, etc. solely or in combination. Meanwhile, the program recorded on the recording medium may have been specially designed and configured for the present invention, or may be known to those skilled in computer software. The computer-readable recording medium includes a hardware device specially configured to store and execute the program, such as a magnetic medium such as a hard disk, a floppy disk, and a magnetic tape, an optical medium such as a CD-ROM or DVD, or a magneto-optical medium, such as a floptical disk, ROM, RAM, or flash memory. Furthermore, the program may include both machine-language code, such as code written by a compiler, and high-level language code, which is executable by a computer using an interpreter. The hardware device can be configured in the form of one or more software modules for executing the operation of the present invention, and the vice versa As described above, although the embodiments of the present invention have been described in connection with specific matters, such detailed elements, and the limited embodiments and drawings, they are provided only to help general understanding of the present invention, and the present invention is not limited to the embodiments. A person having ordinary skill in the art to which the present invention pertains may modify the present invention in various ways from the above description.

What is claimed is:

1. A packet classification method comprising:
partitioning, by a processor, a total rule set into a plurality of sub rule sets using key values corresponding to fields of a packet;
generating, by the processor, a Recursive Flow Classification (RFC) table for each of the partitioned sub rule sets;
loading, by the processor, both of RFC table information and partition information commonly corresponding to a key value of the received packet on a same cache line;
searching for, by the processor, a sub rule set using the partition information corresponding to the key value of the received packet loaded on the cache line; and
searching for, by the processor, an RFC table corresponding to a rule of the received packet loaded on the cache line from among the searched sub rule sets using the RFC table information corresponding to the key value of the received packet loaded on the cache line.

2. The packet classification method of claim 1, the partitioning the total rule set into the plurality of sub rule sets further comprises at least one of:
partitioning, by the processor, in a pre-determined sequence for the key values of the packet; and
partitioning, by the processor, by sequentially searching for optimum key values among the key values corresponding to the fields of the packet.

3. The packet classification method of claim 1, wherein a sequence of key values for searching for the sub rule set is different from a sequence of key values for searching for the RFC table.

4. The packet classification method of claim 1, the loading further comprises:
loading, by the processor, only RFC table information corresponding to a relevant key value of the cache line among the RFC table information corresponding to each of the plurality of sub rule sets.

5. A packet classification method comprising:
partitioning, by a processor, a total rule set into a plurality of sub rule sets using key values corresponding to fields of a packet;
generating, by the processor, a Recursive Flow Classification (RFC) table for each of the partitioned sub rule sets;
generating, by the processor, a chunk container which defines a relation between partition indexes related to the partitions and Class BitMap (CBM) indexes related to the RFC tables according to the key values;

searching, by the processor, the generated chunk container using the key values of the received packet;

loading, by the processor, both of a CBM index and a partition index commonly corresponding to a key value of the received packet on a same cache line; and searching for, by the processor, a partition and an RFC table corresponding to the received packet using the CBM index and the partition index loaded on the cache line.

6. The packet classification method of claim 5, the generating the chunk container further comprises:

generating, by the processor, at least one or more chunk containers, a size of a field of which varies depending on a size of the cache line, the number of sub rule sets to be supported and a size of table memory.

7. The packet classification method of claim 5, wherein the chunk container includes at least one of the CBM index and a rule index.

8. The packet classification method of claim 5, the searching for the partition and the RFC table further comprises:

searching for, by the processor, a CBM index related to the received packet using the chunk containers generated according to the key values from the sub rule set corresponding to the searched partition; and searching for, by the processor, an RFC table related to the received packet using the searched CBM index.

9. A packet classification device comprising:

a processor configured to:

partition a total rule set into a plurality of sub rule sets using key values corresponding to fields of a packet;

generate an RFC table for each of the partitioned sub rule sets;

load both of RFC table information and partition information commonly corresponding to a key value of the received packet on a same cache line;

search for a sub rule set using the partition information corresponding to the key value of the received packet loaded on the cache line; and search for an RFC table corresponding to a rule of the received packet loaded on the cache line from among the searched sub rule sets using the RFC table information corresponding to the key value of the received packet loaded on the cache line.

10. The packet classification device of claim 9, the processor further configured to:

search for the sub rule set in a first sequence of key values to search; and search for the RFC table in a second sequence of key values to search, wherein the second sequence is different from the first sequence.

11. A packet classification device comprising:

a processor configured to:

partition a total rule set into a plurality of sub rule sets using key values corresponding to fields of a packet;

generate a Recursive Flow Classification (RFC) table for each of the partitioned sub rule sets;

generate a chunk container which defines a relation between partition indexes related to the partitions and Class BitMap (CBM) indexes related to the RFC tables according to the key values;

search the generated chunk container using the key values of the received packet;

load both of a CBM index and a partition index commonly corresponding to a key value of the received packet on a same cache line; and search for a partition and an RFC table corresponding to the received packet using the CBM index and the partition index loaded on the cache line.

12. The packet classification device of claim 11, the processor further configured to:

search for a sub rule set including a rule of the received packet using the partition index loaded on the cache line; and search for a CBM index for the received packet from the searched sub rule set and search for an RFC table corresponding to the searched CBM index.

* * * * *